United States Patent
Pirzadeh et al.

(10) Patent No.: US 9,818,112 B2
(45) Date of Patent: *Nov. 14, 2017

(54) METHOD AND SYSTEM FOR PAYMENT AUTHORIZATION AND CARD PRESENTATION USING PRE-ISSUED IDENTITIES

(71) Applicant: Visa U.S.A. Inc., San Francisco, CA (US)

(72) Inventors: Kiushan Pirzadeh, Foster City, CA (US); Simon Hurry, Foster City, CA (US); Thomas Manessis, Pacifica, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 14/225,330

(22) Filed: Mar. 25, 2014

(65) Prior Publication Data

US 2014/0207684 A1    Jul. 24, 2014

Related U.S. Application Data

(63) Continuation of application No. 12/121,611, filed on May 15, 2008, now Pat. No. 8,725,638.

(60) Provisional application No. 60/938,946, filed on May 18, 2007.

(51) Int. Cl.
*G06Q 20/40* (2012.01)
*G06F 21/31* (2013.01)
*G06F 21/34* (2013.01)
*G06Q 20/10* (2012.01)
*G06Q 30/06* (2012.01)
*G06Q 40/02* (2012.01)

(52) U.S. Cl.
CPC ............ *G06Q 20/40* (2013.01); *G06F 21/31* (2013.01); *G06F 21/34* (2013.01); *G06Q 20/10* (2013.01); *G06Q 30/06* (2013.01); *G06Q 40/02* (2013.01); *G06F 2221/2103* (2013.01); *G06F 2221/2135* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 4,438,824 | A | 3/1984 | Mueller-Schloer |
| 4,879,747 | A | 11/1989 | Leighton et al. |
| 4,995,081 | A | 2/1991 | Leighton et al. |

(Continued)

FOREIGN PATENT DOCUMENTS

| | | |
|---|---|---|
| AU | 04001663 | 6/2005 |
| KR | 2000-0024588 A | 5/2000 |

(Continued)

*Primary Examiner* — Leland Marcus
(74) *Attorney, Agent, or Firm* — Kilpatrick Townsend & Stockton LLP

(57) ABSTRACT

Systems and methods for authenticating a party are disclosed. A transaction may be initiated between a relying party and a presenter. The relying party can send the presenter a message with transaction information and requirements for authentication. The presenter can forward the message to a third party, which can authenticate the presenter to the relying party.

21 Claims, 9 Drawing Sheets

(56) References Cited

U.S. PATENT DOCUMENTS

| | | | |
|---|---|---|---|
| 5,590,038 A | 12/1996 | Pitroda | |
| 5,651,067 A | 7/1997 | Ahrens et al. | |
| 6,070,154 A | 5/2000 | Tavor et al. | |
| 6,094,656 A | 7/2000 | De Jong | |
| 6,327,578 B1 | 12/2001 | Linehan | |
| 6,453,296 B1 | 9/2002 | Iwamura | |
| 6,941,285 B2 | 9/2005 | Sarcanin | |
| 7,437,331 B1* | 10/2008 | Rosenberger | G06Q 20/04 705/35 |
| 8,099,077 B2* | 1/2012 | Chowdhury | G06Q 20/02 455/406 |
| 8,590,785 B1* | 11/2013 | Mesaros | G06Q 30/0213 235/383 |
| 2001/0037254 A1* | 11/2001 | Glikman | G06Q 20/12 705/26.41 |
| 2002/0026412 A1 | 2/2002 | Kabin | |
| 2003/0074463 A1* | 4/2003 | Swartz | H04L 12/2602 709/230 |
| 2003/0074665 A1 | 4/2003 | Varley et al. | |
| 2004/0243514 A1 | 12/2004 | Wankmueller | |
| 2005/0049978 A1* | 3/2005 | Kleen | G06Q 20/04 705/72 |
| 2005/0075964 A1* | 4/2005 | Quinn | G06Q 40/04 705/37 |
| 2005/0177510 A1 | 8/2005 | Hilt et al. | |
| 2006/0043164 A1 | 3/2006 | Dowling et al. | |
| 2006/0074765 A1 | 4/2006 | Crawford et al. | |
| 2007/0055630 A1 | 3/2007 | Gauthier et al. | |
| 2007/0170245 A1 | 7/2007 | Elbaum et al. | |
| 2010/0130164 A1* | 5/2010 | Chowdhury | G06Q 20/02 455/410 |
| 2014/0052533 A1* | 2/2014 | Mesaros | G06Q 30/0213 705/14.54 |

FOREIGN PATENT DOCUMENTS

| | | |
|---|---|---|
| KR | 2001-0073982 A | 8/2001 |
| KR | 2003-0017439 A | 3/2003 |

* cited by examiner

METHOD AND SYSTEM FOR PAYMENT AUTHORIZATION AND CARD PRESENTATION USING PRE-ISSUED IDENTITIES

CROSS-REFERENCES TO RELATED APPLICATIONS

This patent application is a continuation of U.S. patent application Ser. No. 12/121,611, filed on May 15, 2008, which is a non-provisional of and claims the benefit of the filing date of U.S. Provisional Patent Application No. 60/938,946, filed on May 18, 2007, all of which are herein incorporated by reference in their entirety for all purposes.

BACKGROUND

During a transaction between two parties, each party typically wants assurances as to the authenticity of the identity, permissions and/or the data relating to the other party so as to avoid a variety of problems, including fraud and transaction repudiation. Such transactions can be either payment or non-payment in nature. In non-payment transactions, for example, one party may want to confirm the identity of the other party before disclosing certain information (e.g., in the exchange of non-payment data such as health care information, personal information, confidential information, or similar information). On the other hand, during a payment transaction using a payment instrument (e.g., a credit, debit, or stored value card), it is important to verify a user's ownership of an account to avoid unauthorized use of the payment instrument. Also, during payment transactions, it may be necessary to communicate payment information (such as an account number or the like) to be used in performing the transaction. For purposes of this application, references to "transactions" shall include both payment and non-payment transactions.

Authentication procedures during transactions when two parties are interacting in each other's physical presence (referred to as "in-person" transactions) can involve verifying that the signature of a user matches the signature on a piece of identification or a payment instrument, such as a credit card. Another authentication procedure involves verifying that a photograph contained in a form of identification, such as a driver's license, matches the physical appearance of the user.

However, transactions initiated and accomplished over a public network, such as the Internet, are riskier because the "in-person" authentication procedures cannot be performed. Such transactions can be initiated from devices such as but not limited to mobile phones, "smartphones," Internet-connected computers or terminals, or Personal Digital Assistants (PDAs). Techniques known in the art, such as the use of user-name/password pairs, have disadvantages. First, parties wishing to authenticate themselves or their profiles must remember multiple such user-names and passwords, as different relying parties require different sets of authentication information. Second, user-names and passwords are not inherently capable of conveying an arbitrary set of authentication claims. A user-name and password serve only to assure the relying party that the authenticating party is who he claims, but cannot serve to assure the relying party of any assurances made about the authenticating party's identity by third parties ("issuers"). Given the continuing increase in the number of transactions that take place over public networks, it is important to provide methods to authenticate the identity and profile data of individuals. Authentication techniques during such transactions will reduce the levels of fraud and disputes, which in turn will reduce the costs associated with each of these events.

Another technique for authentication is the use of identity metasystems, such as Microsoft's CardSpace. CardSpace can provide methods and systems for authenticating the identity and permissions and validating the profile data of an individual ("a presenter") who presents him or herself to another party ("a relying party") as having a certain identity and permissions and having certain corresponding profile data, and relying on that authentication so as to allow a transaction, such as a payment, to proceed. An "identity" is a set of one or more claims relating to the presenter. A "claim" represents a fact about the presenter. Claims can include assertions that the presenter is a specific person, that the presenter is a certain age, the presenter is licensed to drive, etc. The presenter may be asserting a self-issued identity or an identity issued by a third-party ("the issuer"). For example, a driver's license corresponds to a particular identity and is issued by the government, while an organization membership card (such as a car club or gym membership) corresponds to another identity and is issued by the organization.

CardSpace provides a method for providing assurance of a presenter's identity to a relying party, such as a merchant, over a public network. The relying party sends a "policy" to the presenter. The policy is a set of requirements that can be used to determine which of possibly multiple presenter identities should be used in the transaction. For example, the policy could indicate that the relying party requires a government issued identity. The presenter may then select from among a set of qualifying identities. A request is then made to the issuer corresponding to the appropriate identity for electronic data corresponding to the specific identity. The electronic data is sent by the issuer through the CardSpace system, to the presenter. The presenter reviews the data and decides whether to send it to the relying party. The relying party can receive the data, through which the identity of the presenter can be authenticated. If the policy permits a self-issued card to be used, then the process is the same, except that there is no need to interact with a third-party issuer.

A system for authenticating the identity and profile data of an individual during a transaction, such as a payment transaction, over a public network would be desirable. Such an authenticating system should be relatively easy to implement and use, require a minimal investment of resources, and provide a high level of interoperability between the system's participants.

BRIEF SUMMARY

Embodiments of the present invention pertain to methods and systems for engaging in transactions, such as payment card transactions, that can use authentication techniques.

One embodiment of the invention is directed towards a method involving a presenter for completing a transaction. The method comprises providing one or more virtual cards to a presenter, wherein each virtual card relates to an identity; receiving authentication data relating to a selected virtual card; verifying said authentication data; receiving a message routed by the presenter from a relying party, wherein the message includes an identifier for the relying party and a transaction amount; and sending a message through the presenter to the relying party, wherein the message contains transaction information and data related to the identity associated with the virtual card.

Another embodiment of the invention is directed towards a method for completing a transaction. The method comprises receiving one or more virtual cards, by one or more issuers, wherein each said virtual card relates to an identity; receiving from a relying party a policy, wherein said policy relates to one or more requirements; receiving from the relying party data representing underlying transaction details; selecting an eligible virtual card; sending authentication data to an issuer corresponding to said virtual card; forwarding the underlying transaction details to the issuer; receiving, from the issuer, a message containing data related to the identity associated with the virtual card to the relying party; and forwarding the message to the relying party.

Another embodiment of the invention is directed towards a method involving a presenter, an issuer, and a relying party for completing a transaction. The method comprises receiving a request for a transaction; sending transaction details to the presenter, wherein the transaction details include a merchant identifier, a transaction identifier, and a transaction amount; receiving a message from the presenter, wherein the message has been sent to the presenter by the issuer; and verifying the signature of the message.

Another embodiment of the invention is directed towards a computer readable medium comprising code for providing one or more virtual cards to the presenter, wherein each virtual card relates to an identity; code for receiving authentication data relating to a selected virtual card; code for receiving a message from a relying party relating to the transaction; code for verifying said authentication data; and code for sending a message containing data related to the identity associated with the virtual card to the relying party, wherein the message further contains transaction information.

Another embodiment of the invention is directed towards a computer readable medium comprising code for receiving and storing one or more virtual cards, by one or more issuers, wherein each said virtual card relates to an identity; code for receiving from a relying party a policy, wherein said policy relates to one or more requirements; code for receiving from the relying party data representing underlying transaction details; code for selecting an eligible virtual card; code for sending authentication data relating to said selected virtual card to the issuer corresponding to said virtual card; code for forwarding the underlying transaction details to the issuer; code for receiving, from the issuer, a message containing data related to the identity associated with the virtual card to the relying party; and code for forwarding the message to the relying party.

BRIEF DESCRIPTION OF THE DRAWINGS

The invention, together with further advantages thereof, may best be understood by reference to the following description taken in conjunction with the accompanying drawings in which.

DETAILED DESCRIPTION

Figure 1:
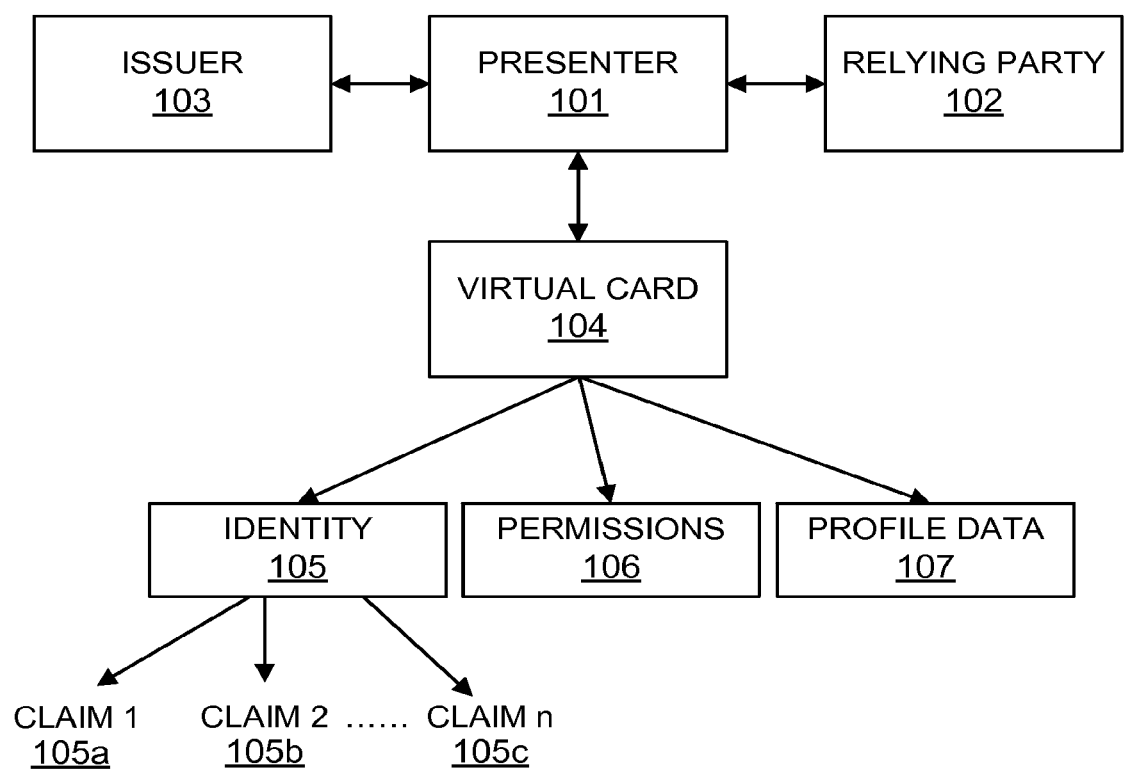
FIG. 1 is a block diagram of a relationship among parties according to an embodiment of the invention.

Embodiments of the present invention relate to methods and systems for transmitting, over a public network, payment-related data that has been authenticated and verified.

In certain embodiments, a consumer may wish to purchase goods or services from a merchant over the Internet. The merchant may require assurances that the consumer is the person she says she is, and is able to pay the cost of the purchased goods or services. For example, the consumer may select a good such as a book, for purchase from the merchant's website. The consumer can then select the method of payment. The consumer may have one or more virtual cards stored on a computer. Each virtual card can be provided by an issuer, and may contain separate payment information. In effect, the virtual card can be similar to a credit card, with the issuer acting in a similar way to a financial institution that issues a credit card. At this point, the consumer can select a specific virtual card to use for payment, or can do so later in the process. The merchant may then send to the consumer's computer a message that contains a policy, which can contain information relating to the transaction. For example, the policy may include the merchant's identification information (including name, location, and other identifying details such as an ID number), a transaction identifier, the amount of the transaction, etc.

Once the customer receives the policy, she can invoke a payment application on her computer. The payment application can store the customer's various virtual cards possessed by the customer. The application can review the policy sent by the merchant, and identify for the customer which virtual cards she can use for payment. The customer can then select a virtual card. The customer may then be required to authenticate herself to the issuer associated with the chosen card, such as by use of a password or other means. Next, the payment application can send the authentication information, along with the policy, to the issuer. The issuer can verify the authentication data and check to see if there is enough credit in the consumers account to make the transaction. If the issuer authorizes the transaction, it can then send a message containing authorization information to the consumer. The consumer's computer can then forward the authorization message to the merchant, and then the transaction can proceed with payment and settlement.

The above example provides a way for a consumer to authenticate herself to a merchant by using virtual cards. The messages between parties can be sent over the Internet, and may be encrypted or otherwise digitally signed. This permits for easy and secure communications. Furthermore, the consumer is authenticated to the merchant by the issuer. This can allow the merchant to be more certain that neither the consumer nor the payment information is fraudulent.

Embodiments of the present invention will now be described in detail with reference to exemplary preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

I. Exemplary Systems

FIG. 1 shows the basic relationship structure for establishing and authenticating the identity and permissions, and validating the profile data, of an individual according to an embodiment of the invention. The system of FIG. 1 can be implemented in software, hardware, or both, corresponding to public key infrastructure, smart cards, or a system such as Microsoft's CardSpace, Higgin's Project, RealID, Liberty Alliance, or other identity management systems.

The individual ("a presenter") 101 can present him or herself to another party ("a relying party") 102 as having a virtual card 104 comprising a certain identity 105, certain permissions 106, and having certain corresponding profile data 107. An identity comprises one or more claims 105a, 105b . . . 105n) relating to the presenter, and need not be limited to a claim concerning who the presenter is. For example, claim 105a can be the name of the presenter, claim 105b can be her age, and claim 105n can be a payment account number. Embodiments of the invention contemplate virtual cards that correspond to a physical payment card, such as a credit card account. In certain exemplary embodiments of the invention, some or all virtual cards may not correspond to a physical payment card. For example, a virtual card may comprise an account identifier (such as a payment account number) that does not correspond with any payment card. The relying party 102 can be a service provider, a government agency, a merchant, or any other entity that may need assurances regarding the identity of the presenter before proceeding with a transaction. Authentication of identity refers to verifying the asserted claims 105a, 105b . . . 105n) of the presenter 101. Validating permissions refers to verification that the presenter 101 is authorized to utilize a service or perform the specified action (i.e., that the presenter 101 has the correct permissions 106). Validating profile data pertains to validating that profile data 107 provided by a presenter 101 actually is associated with the presenter 101. Other capabilities such as profile data provisioning and profile updating can also be performed. These functions can be performed individually or in any combination with each other.

The virtual card 104 can be provided to the presenter 101 by the issuer 103. This can be done, for example, when the presenter registers on a website of the issuer 103, and then receives and stores the virtual card 104 on a network access device. During registration, the presenter 101 may be asked to provide certain authentication data for later use, such as a user ID and password combination, biometrics, or other authentication means. The presenter 101 may also provide bank account information, a home address, or other information required by the issuer 103 to register.

Figure 2:
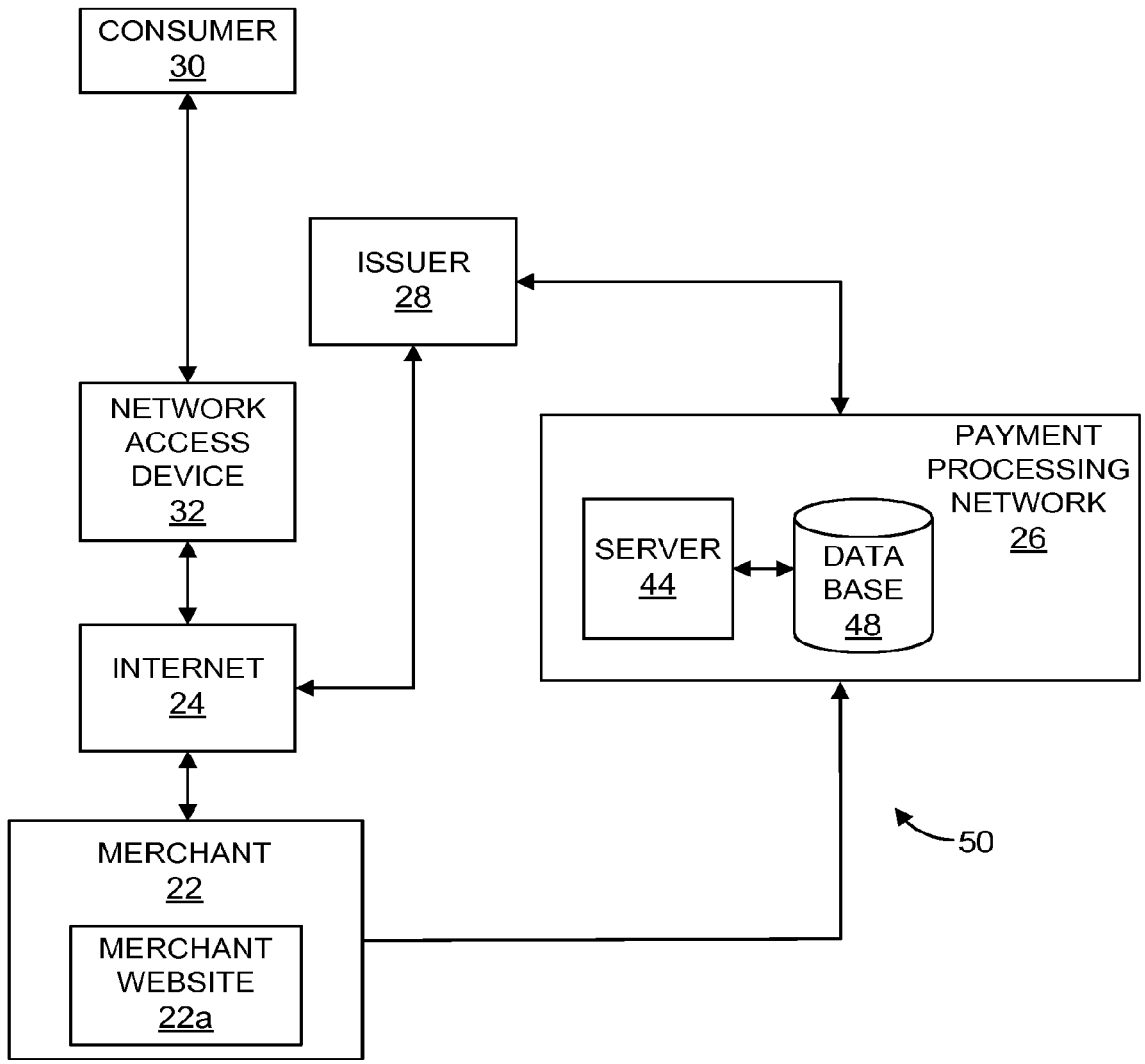
FIG. 2 is a block diagram of a system according to an embodiment of the invention.

FIG. 2 shows a system 50 according to an embodiment of the invention. Other systems according to embodiments of the invention may include fewer or more components than are specifically shown in FIG. 2.

FIG. 2 shows a consumer 30 (who can act as a presenter from FIG. 1), a network access device 32, the Internet 24, a merchant 22 (who can act as the relying party from FIG. 1), a payment processing network 26, and an issuer 28, in operative communication with each other. The consumer 30, the merchant 22, and the issuer 28 can all communicate with each other over the Internet 24. In certain implementations, the consumer 30 can access the Internet through the network access device 32. The merchant 22 and issuer 28 can also communicate through the payment processing network 26. As described above, an "issuer" is typically a business entity (e.g., a bank) which maintains financial accounts for the consumer. The issuer 28 can issue a portable consumer device such as a credit or debit card to the consumer, and may also provide the virtual card of FIG. 1 to the consumer. A "merchant" is typically an entity that engages in transactions, such as a store, person, or service provider. The merchant 22 may comprise a merchant website 22a. In a payment transaction, a consumer 30 may purchase goods or services from the merchant 22 over the Internet 24 using a network access device 32. The merchant 22 can provide transaction details to the consumer 30 and receive authentication from the issuer 28 over the Internet 24. The merchant 22 can then proceed with payment and settlement.

In certain embodiments, there is an "acquirer" (not shown in FIG. 2), which is typically a business entity, e.g., a commercial bank that has a business relationship with a particular merchant or other entity. In these embodiments, the merchant 22 can communicate with the issuer 28 or the payment processing network 26 by means of the acquirer. Some entities can perform both issuer and acquirer functions. Embodiments of the invention encompass such single entity issuer-acquirers.

The consumer (i.e., the presenter) 30 may be an individual, or an organization such as a business that is capable of purchasing goods or services.

The network access device 32 may be in any suitable form. For example, suitable network access devices can be hand-held and compact so that they can fit into a consumer's wallet and/or pocket (e.g., pocket-sized). They may include smartphones, mobile phones, tablet computers, etc. Other examples of network access devices include personal digital assistants (PDAs), pagers, computers, Internet-connected televisions, and the like. The merchant (i.e., the relying party) 22 may also access the Internet 24 through a network access device (not shown).

Figure 9:
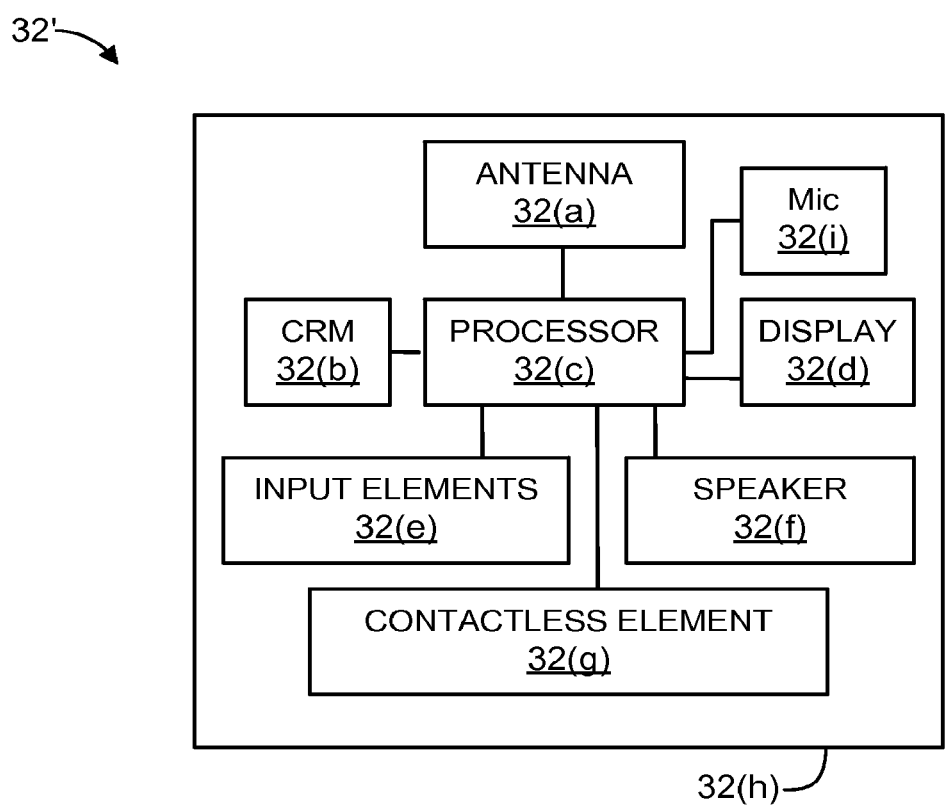
FIG. 9 shows a block diagram of a network access device.

An exemplary network access device 32' in the form of a phone may comprise a computer readable medium and a body as shown in FIG. 9. (FIG. 9 shows a number of components, and the network access devices according to embodiments of the invention may comprise any suitable combination or subset of such components.) The computer readable medium 32(b) may be present within the body 32(h), or may be detachable from it. The body 32(h) may be in the form a plastic substrate, housing, or other structure. The computer readable medium 32(b) may be a memory that stores data and may be in any suitable form including a magnetic stripe, a memory chip, encryption algorithms, private or private keys, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc.

Computer readable medium 32(b) may also include code for storing and running a payment application, and code for communicating with an issuer and a relying party, as described herein.

The network access device 32' may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) network access device 32' and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the network access device 32 and an interrogation device. Thus, the network access device 32 is capable of communicating and transferring data and/or control instructions via both cellular network and near field communications capability.

The network access device 32' may also include a processor 32(c) (e.g., a microprocessor) for processing the functions of the network access device 32' and a display 32(d) to allow a consumer to see phone numbers and other information and messages. The network access device 32' may further include input elements 32(e) to allow a consumer to input information into the device, a speaker 32(f) to allow the consumer to hear voice communication, music, etc., and a microphone 32(i) to allow the consumer to transmit her voice through the network access device 32'. The network access device 32' may also include an antenna 32(a) for wireless data transfer (e.g., data transmission).

The payment processing network 26 may have a server computer 44, as well as a database 48. The server computer 44 is typically a powerful computer or cluster of computers. For example, the server computer can be a large mainframe, a minicomputer cluster, or a group of servers functioning as a unit. In one example, the server computer may be a database server coupled to a web server. The server computer may comprise a computer readable medium comprising code for processing transactions as detailed below, including code for receiving messages from merchants, acquirers, and issuers, code for generating unique transaction identifiers and associating them with specific transactions, code for sending messages, code for identifying issuers, and code for clearing and settling transactions and chargeback requests in substantially real time.

The server computer 44 may also comprise a computer readable medium comprising: code for providing one or more virtual cards to the presenter, wherein each virtual card relates to an identity; code for receiving authentication data relating to a selected virtual card; code for receiving a message from a relying party relating to the transaction; code for verifying said authentication data; and code for sending a message containing data related to the identity associated with the virtual card to the relying party, wherein the message further contains transaction information.

The network access device 32 may also comprise code for receiving, code for receiving and storing one or more virtual cards, by one or more issuers, wherein each said virtual card relates to an identity; code for receiving from a relying party a policy, wherein said policy relates to one or more requirements; code for receiving from the relying party data representing underlying transaction details; code for selecting an eligible virtual card; code for sending authentication data relating to said selected virtual card to the issuer corresponding to said virtual card; code for forwarding the underlying transaction details to the issuer; code for receiving, from the issuer, a message containing data related to the identity associated with the virtual card to the relying party; and code for forwarding the message to the relying party.

The payment processing network 26 may comprise or use a payment processing network such as VisaNet™. The payment processing network 26 and any communication network that communicates with the payment processing network 26 may use any other suitable wired or wireless network, including the Internet 24. The payment processing network 26 may be adapted to process ordinary debit, credit card or other payment card transactions as well as other payment transactions.

Although the payment processing network 26 is illustrated as being operationally between a merchant 24 and an issuer 28, it need not be in other embodiments of the invention. It may include any suitable combination of computer apparatuses which can facilitate the processing described in this application.

For simplicity of illustration, one consumer 30, one network access device 32, one merchant 22, and one issuer 28 are shown. However, it is understood that in embodiments of the invention, there can be multiple consumers, network access devices, merchants, issuers, as well as server computers, databases, accounts, etc.

Embodiments of the invention can be advantageously used in transactions over a public network where such authentication is difficult to perform. For instance, a presenter who is a customer purchasing goods using a merchant's Internet web site, may use embodiments of the present invention to provide the merchant with payment information. In one embodiment, an issuer interacts with the presenter to supply data which is then sent, either directly or indirectly, to the merchant. The techniques of embodiments of the present invention allow the issuer to securely provide a definitive answer regarding the authenticity of identity or permissions to the relying party.

Figure 8:
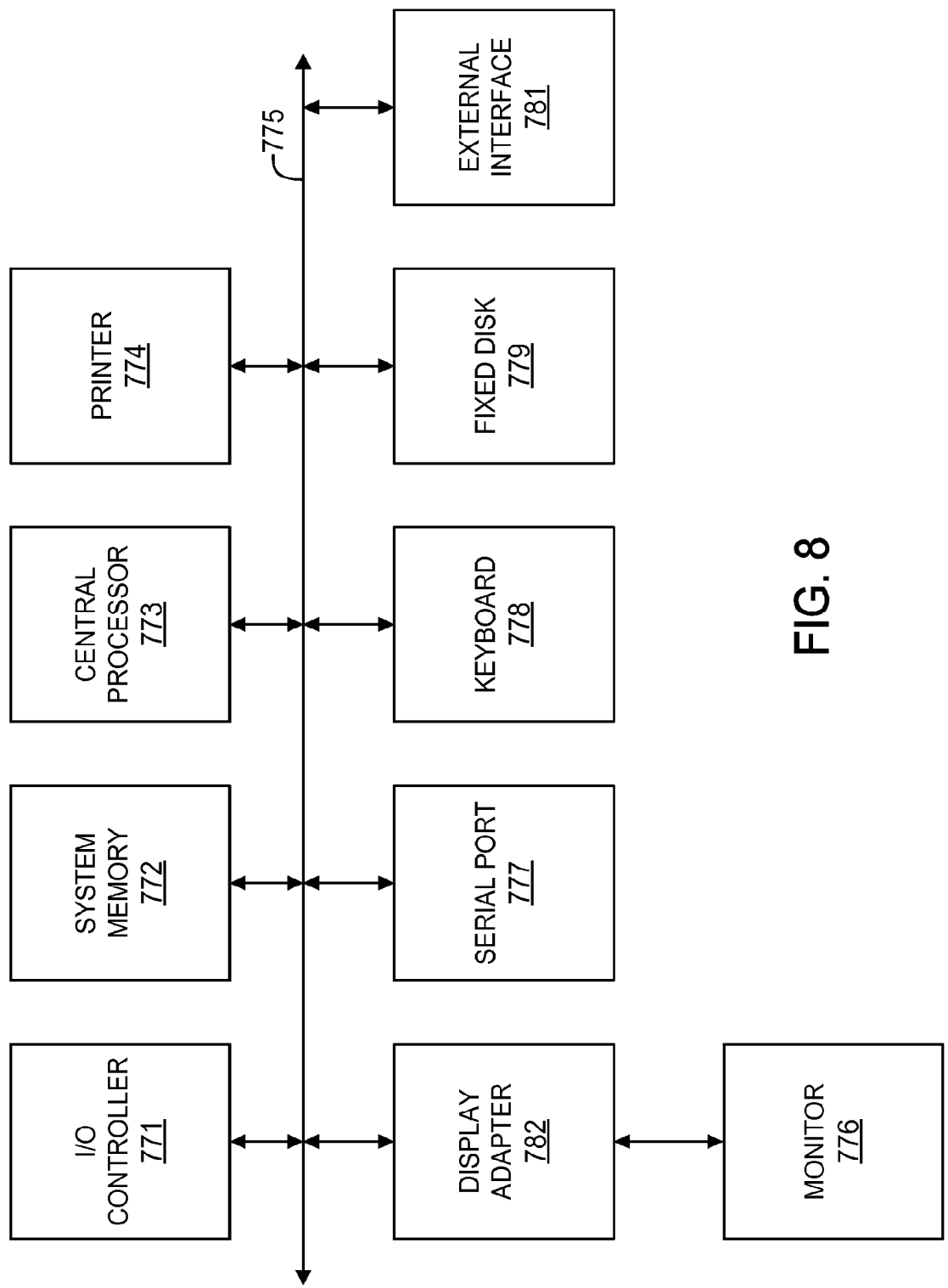
FIG. 8 shows a block diagram of a computer apparatus.

The various participants and elements in FIG. 2 may operate or use one or more computer apparatuses to facilitate the functions described herein. Any of the elements in FIG. 2 (e.g., the access device 32, the issuer 28, the merchant 22, etc.) may use any suitable number of subsystems to facilitate the functions described herein. Examples of such subsystems or components are shown in FIG. 8. The subsystems shown in FIG. 8 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

Embodiments of the invention are not limited to the above-described embodiments. For example, although separate functional blocks are shown for an issuer, payment processing system, and acquirer, some entities perform all of these functions and may be included in embodiments of invention.

It should be understood that the present invention as described above can be implemented in the form of control logic using computer software in a modular or integrated manner. Based on the disclosure and teachings provided herein, a person of ordinary skill in the art can know and appreciate other ways and/or methods to implement the present invention using hardware and a combination of hardware and software Any of the software components or functions described in this application, may be implemented as software code to be executed by a processor using any suitable computer language such as, for example, Assembly, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

II. Exemplary Methods

A. Form Fill Transaction

Figure 3:
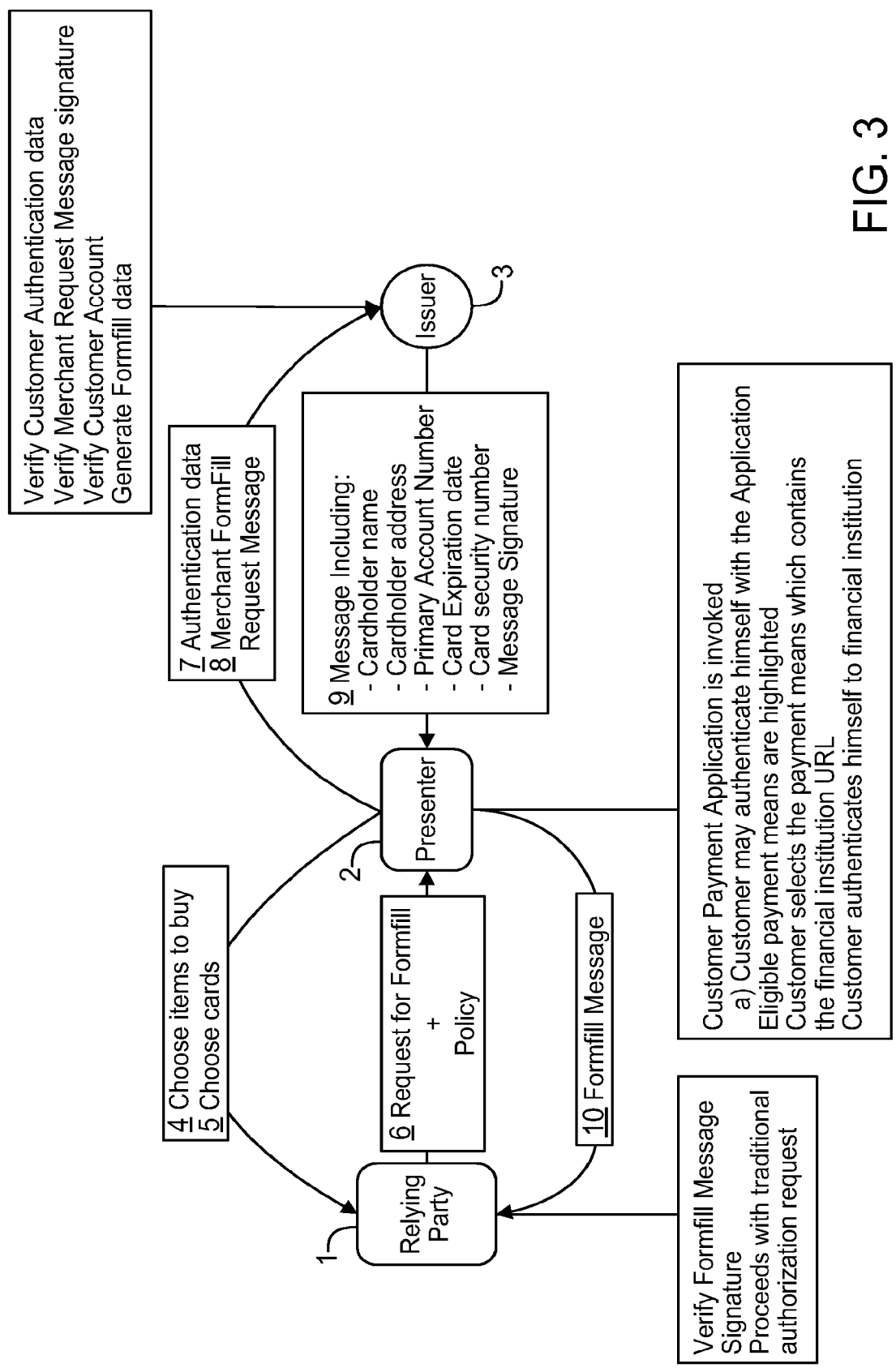
FIG. 3 shows a transaction according to one embodiment of the present invention.

FIG. 3 shows a system architecture and exemplary message flows for one embodiment according to the present invention. Embodiments of the present invention can be used during transactions that occur over a public network, such as the Internet, or over other types of public or private networks.

Embodiments of the present invention include a presenter 2, a relying party 1, and an issuer 3. In some embodiments, depending on the nature of the identity being asserted, the issuer 3 may be identical to the presenter 2. The presenter 2 can be the user, individual, or consumer whose identity is being authenticated and whose permissions or data is being validated or provisioned. The relying party 1 can be a party with whom the presenter is attempting to transact, and is the party which requires the presenter to establish her identity or permissions. For a commercial transaction, the relying party 1 will typically be a merchant. It will be apparent to those with skill in the art that if the presenter is performing a non-commercial transaction, the relying party may be some other type of entity, such as a government or other type of agency, a corporate entity, or another individual with whom the presenter wishes to transact. The presenter 2 can perform the transaction using a variety of network access devices as described above, including cellular phones and computer workstations.

The issuer 3 is the entity that authenticates and provides the presenter's identity, validates permissions, and validates, provisions, or updates data relating to presenter. The issuer 3 has an established relationship with the presenter 2 and therefore has a reliable set of the presenter's profile data prior to a transaction that requires data services. For example, the issuer 3 can be a bank, a credit or debit card-issuing bank, or a credit or debit card service organization (e.g., Visa). For example, this bank can be the issuing bank of a payment card that is available for use by this presenter 2. Presenter 2 can be a customer of this bank or a holder of an authorized payment card. As in this specific example, the relationship between presenter 2 and issuer 3 usually is such that it can be trusted that the profile information relating to presenter 2 is accurately held by the issuer 3. One skilled in the art will recognize that references to "party" or "parties" represent references to both individuals or entities, as well as references to systems and apparatuses used by these entities for interfacing with the described invention. These systems and apparatuses could include computer servers, network access devices, and networking components, for example.

A typical transaction using an embodiment of the present invention would be a transaction between a customer and a merchant, where the customer is using the Internet to purchase something using the merchant's Internet web site. In FIG. 3, the customer (presenter 2) uses a network access device to interact with the merchant (relying party 1). It should be understood that the terms "merchant," "customer," "relying party," and "presenter" may refer both to specific entities and with systems and apparatuses used by those entities to perform the transaction, for example computer hardware or networking equipment. It is assumed that the presenter 2 has already been issued one or more "virtual cards," each representing a set of claims corresponding to an identity, by the issuer 3. These virtual cards may be stored on the presenter's network access device (for example, a computer system) or may otherwise be accessible for use at the network access device. The presenter 2 chooses items to buy in step 4. For example, the presenter 2 may use a web browser to view the website of the relying party 1. The presenter 2 can then select a product or service from the website to buy, and can indicate that she is ready to purchase. It should be apparent to those having ordinary skill in the art that a variety of other mechanisms may be used by the presenter 2 to initiate the transaction.

In one embodiment of this aspect of the invention, in step 6, after choosing items to purchase, the relying party 1 would send data back to the presenter 2, said data comprising a policy. This policy can include requirements that define which of various possible identities will be accepted by the relying party 1. For example, the policy may contain data that indicates that an identity corresponding to a form of payment is required. The policy may also contain a "formfill request message" that lists certain information, such as payment account number, presenter name, etc, that the relying party 1 will require to complete the transaction. The policy message, as well as any other message, may be sent in encrypted or otherwise secured format, including but not limited to message authentication codes, in order to maintain the security of the overall system.

In one implementation, prior to sending the policy, the relying party 1 may require the presenter 2 to interact with the relying party's system so as to inform the relying party 1 that the presenter 2 chooses to proceed with this particular type of transaction, in step 5 (as opposed to other methods of identity verification and payment such as typing in a physical credit card's details). In step 5, the presenter 2 may also activate a payment application on her network access device, to allow for completion of the transaction. In certain embodiments, the payment application may load automatically upon certain triggers, such as when the presenter 2 chooses something to purchase or when she receives the policy. In some embodiments, the payment application can always be running on the network access device, and does not need to be specifically activated prior to completing the transaction.

When the presenter's network access device receives the policy in step 6, from the relying party 1, it may invoke an interface from which the presenter 2 can choose from eligible virtual cards, where eligibility is determined based on the requirements of the policy. Note that the presenter 2 may be required to authenticate herself to the system before or after being permitted to choose a virtual card. This authentication could be through means such as a password, the use of a biometric authentication device, or other suitable means.

Once the presenter 2 selects a particular virtual card, if it is not self-issued (i.e., not created by the presenter herself), the presenter 2 authenticates herself to the issuer 3 associated with the chosen virtual card in step 7. If the identity is self-issued (i.e., created by the presenter), then no such authentication need take place. The authentication can be done through the use of a password, a biometric device, or other suitable means. This authentication step 7 can be separate from, or part of, the authentication step used to choose a virtual card as described above. The authentication data is sent in step 7 from the presenter 2 to the issuer 3.

In step 8, which may be performed separately or concurrently with step 7, the presenter 2 forwards the formfill request message sent by the relying party 1. The presenter 2 may also forward, in step 8, other portions of the policy, such as a merchant identifier, transaction amount, transaction number, etc. The issuer 3 then verifies the presenter's authentication data. Next, the issuer 3 verifies the presenter's account and generates a message in step 9 which is sent back to the presenter 2. This message may contain a variety of claims about the presenter 2, including but not limited to her name, address, an account number used for payments, the account expiration date, account security number, and a message signature. The message in step 9 includes an example of "transaction information", and can be information relating to the current transaction. In certain embodiments, this message can be routed in step 10 to the relying party 1 through the presenter 2. In other embodiments, the message can be sent directly to the relying party 1.

If the message is sent to the presenter 2, it may be presented to the presenter 2 through the use of a web browsing interface by filling in a payment information form. At this point, the presenter 2 can verify the information and decide whether or not to proceed with the transaction by submitting the data to the relying party 1. For example, the issuer 3 can fill in provide the information requested on the payment information form on a website of the relying party that is used for purchases. In exemplary embodiments, the payment application will coordinate with the web browser to fill in the payment information form. Because the issuer 3 fills in the information, the relying party 1 is able to trust the information.

The relying party 1, having received the identity information either directly or indirectly from the issuer, proceeds to verify the message signature. If the message signature is authentic, the relying party 1 proceeds with the transaction using traditional means, for example through a payment card authorization and settlement transactions. Such authorization and settlement can be done using a payment processing network as shown in FIG. 2.

B. Card Present Transaction

Figure 4:
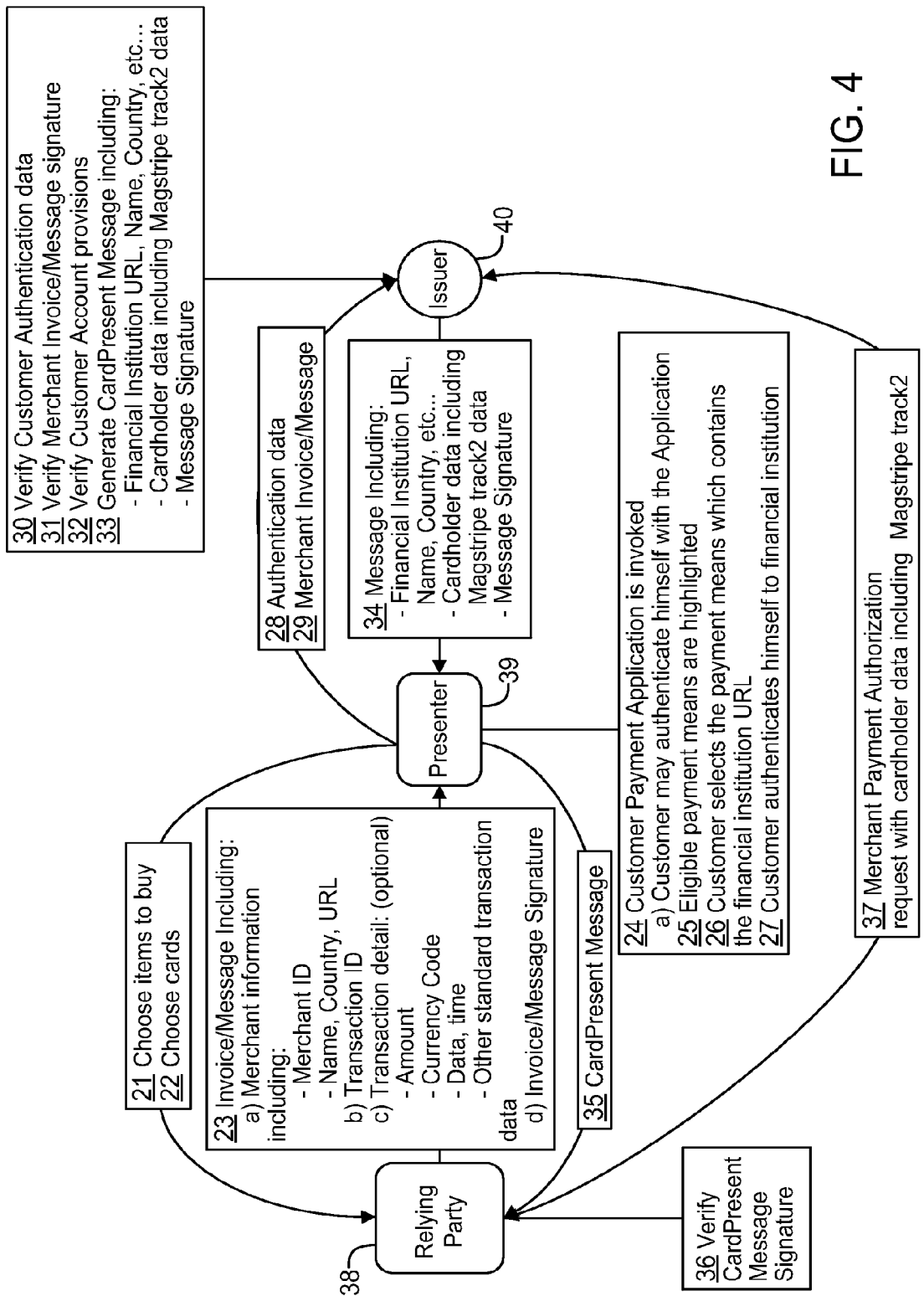
FIG. 4 shows a transaction according to another embodiment of the present invention.

FIG. 4 describes an embodiment of the present invention, which allows a transaction to proceed as if the two parties to the transaction were co-located (i.e., performing the transaction in person), despite the parties being geographically separated and using a public network, such as the Internet, to consummate the transaction.

As with the previous embodiment, there is a relying party 38 (such as a merchant), a presenter 39 (such as a customer), and an issuer 40 (such as a financial institution). The terms "merchant," "customer," "financial institution," and "party" refer both to individuals or entities and to systems used by these individuals or entities to carry out the invention. Additionally, as with the prior embodiment, any or all of the messages may be encrypted or protected using cryptographic means to prevent interception or alteration. The initial steps are similar to that of FIG. 3: the presenter 39 has been issued a "virtual card" by the financial institution, and that this virtual card resides on the presenter's computer or other access device. The presenter 39 chooses items to buy in step 21 and, optionally, selects a card to consummate the transaction using this invention in step 22. In response, the relying party 38 sends a message to the presenter 39 in step 23. This message represents a policy and may contain such information as the relying party's identification information (including a merchant identifier, merchant name, and location of the merchant), a transaction identifier, a merchant invoice containing details of the transaction including amount, type of currency, and date and time of the transaction, and a message signature. The policy may include any or all of the above listed data, as well as additional data not listed.

Upon receiving the policy message, the customer payment application may be invoked in step 24. The presenter 39 will be presented with a set of eligible virtual cards in step 25, wherein each virtual card can be stored on or accessible to the network access device, where eligibility is determined by the requirements in the policy. This may be accomplished using a user interface generated by software on the presenter's network access device.

The presenter 39 selects a particular eligible virtual card in step 26 and may authenticate that virtual card as described above in step 27. The authentication data in step 28 is sent, from the presenter 39, to the issuer 40 for verification. In step 29, the relying party forwards the policy of the relying party to the issuer 40. As stated above, this policy can contain a merchant invoice including transaction information.

The financial institution verifies the presenter's authentication data in step 30 and the relying party policy in step 31. This policy, including the amount of the transaction, can be used in verifying the presenter's account in step 32. Step 32 can include checking the presenter's account to verify that she has enough funds to pay for the transaction. However, as previously stated, the policy need not contain information such as transaction amount. Once account information and authentication data is verified, the financial institution can generate a Card Present Message in step 33. This message may contain payment card data for a card associated with presenter 39, which can include an account number, expiration date, "track 2" data which is normally included on a payment card magnetic stripe (and read by a merchant when consummating in person transactions), and contact or contactless chip data. The message may also include information on the financial institution associated with the payment account, such as a website for the financial institution, the name, location and identifier information of the institution. The message generated in step 33 is an example of "transaction information", and can be information relating to the current transaction.

By including this track 2 data (or contact or contactless chip data) and sending it to the relying party 38, a transaction can be processed as if the presenter 39 was making a purchase with the relying party 38, in person. The message can also be digitally "signed" using, for example, a cryptographically-obtained message authentication code. For example, the message might be hashed, and the hash encrypted with a private key, in which case the integrity of the message can be verified by the recipient by decrypting the value with a corresponding public key and comparing it to a locally-computed hash. Other such digital signing techniques may be used. This message is sent to the presenter 39 in step 34 and forwarded by the presenter 39 in step 35 to the relying party 38. The relying party 38 verifies the message signature in step 36. If the message signature is found valid in step 36, the relying party can proceed with a traditional payment authorization and settlement in step 37. Because the message from the issuer (sent to the relying party in steps 34-35) contains the track 2 information (or contact or contactless chip data), the relying party can contact a payment processing network and proceed with the transaction as if it was a card-present transaction. In this way, the relying party can use the information contained in the message to complete the transaction over a payment processing network.

C. Payment Authorization Transaction

Figure 5:
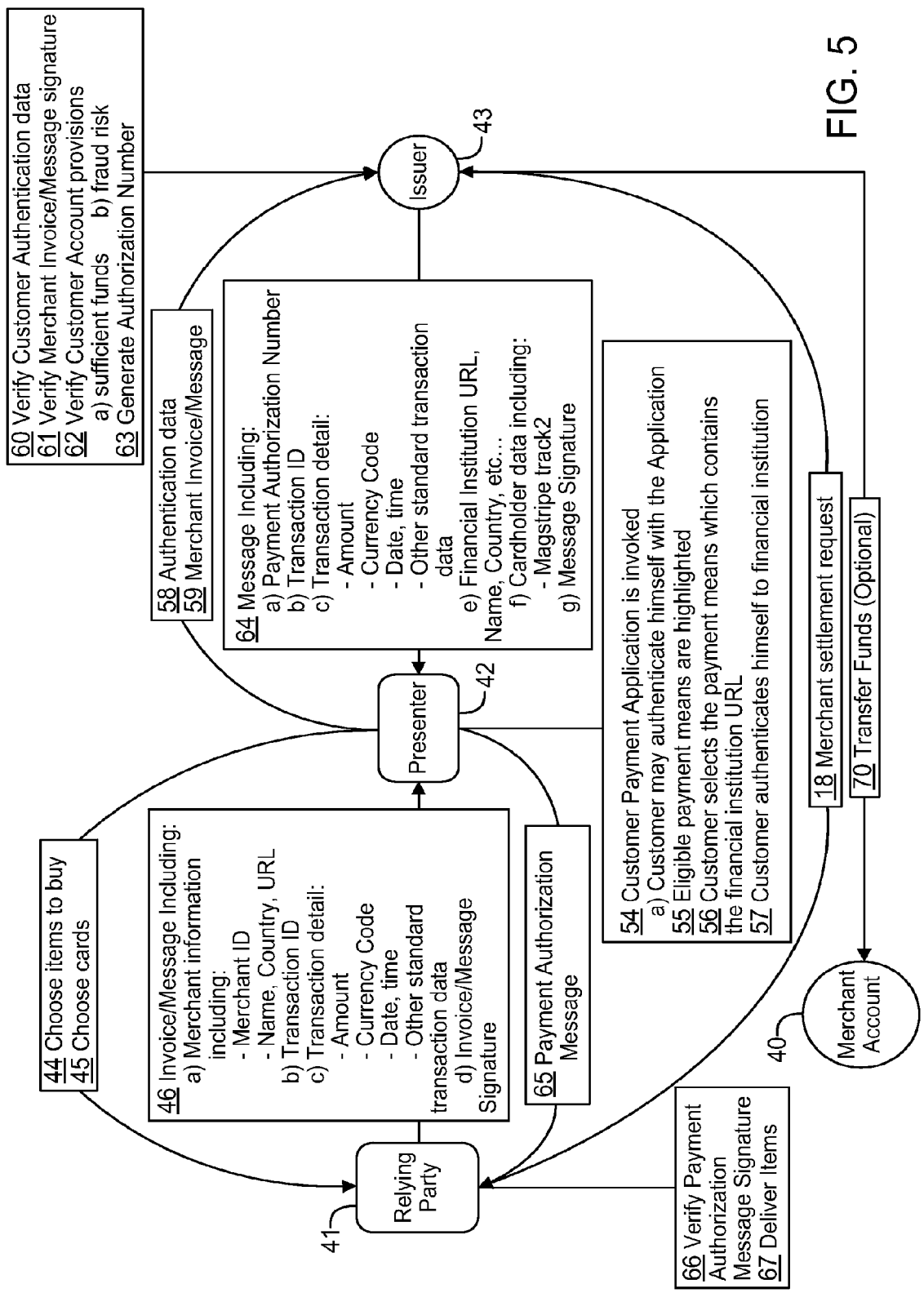
FIG. 5 shows a transaction according to another embodiment of the present invention.

FIG. 5 describes another embodiment of the present invention, where the invention is used to provide a payment authorization from a financial institution. This payment authorization message can be sent from the financial institution, to the customer, and then forwarded from the customer to the merchant.

As with the previous embodiments, there is a merchant, a customer, and a financial institution corresponding to a relying party 41, a presenter 42, and an issuer 43 respectively. The terms "merchant," "customer," "financial institution," and "party" refer both to individuals or entities and to systems used by these individuals or entities to carry out the invention. One skilled in the art will recognize that the invention is applicable to other types of transactions, in which case the parties might not be a merchant, a customer, or a financial institution. Additionally, as with the prior embodiment, any or all of the messages may be encrypted or protected using cryptographic means to prevent interception or alteration. As in previous embodiments, the starting assumption is that the presenter 42 has been issued a "virtual card" by the financial institution, and this virtual card can reside on the presenter's computer or other network access device. The virtual card can represent a particular identity, including one or more particular claims relating to the presenter 42.

The presenter 42 chooses items to buy in step 44 and, optionally, selects a card to consummate 45 the transaction using this invention in step 45. Step 45 can be accomplished by alerting the relying party 41 that an embodiment of the invention will be used, or by invoking a customer payment application, or by other suitable means. In response, the relying party 41 sends a message 46 to the presenter 42 in step 46. This message represents a policy and may contain such information as the relying party's identification information (including a merchant identifier, merchant name, and location of the merchant), a transaction identifier, a merchant invoice containing details of the transaction including amount, type of currency, and date and time of the transaction, and a message signature. The policy may include any or all of the above listed data, as well as additional data not listed. Some or all of the above listed data may be sent in a single message or via a plurality of messages.

Upon receiving the policy message, the customer payment application may be invoked in step 54. The presenter 42 will be presented with a set of eligible virtual cards in step 55, wherein each virtual card can be stored on or accessible to the network access device, where eligibility is determined by the requirements in the policy. This may be accomplished using a user interface generated by software on the presenter's network access device.

The presenter 42 selects a particular eligible virtual card in step 56 and may authenticate that virtual card, such as by a password or a biometric device, in step 57. The chosen eligible virtual card can contain contact information for the associated issuer, such as a web address, for use in the authentication. The authentication data in step 58 is sent, from the presenter 42, to the issuer 43 for verification. In step 59, the presenter 42 forwards the policy of the relying party 41 to the issuer 43. As stated above, this policy can contain a merchant invoice including transaction information.

The financial institution associated with the chosen virtual card (such as the issuer or a financial institution the issuer is in communications with) can verify the presenter's authentication data in step 60 and the relying party policy in step 61. Step 62 can include checking the presenter's account to verify that she has enough funds to pay for the transaction, and also determining fraud risk, as is known in the art. Assuming the account information and authentication data is verified, the financial institution can generate an payment authorization number in step 63.

Assuming the data is verified, the financial institution can generate a payment authorization message in step 63. This message may contain presenter cardholder data including data which is normally included on a payment card magnetic stripe (as in FIG. 4), as well as the payment authorization number, a transaction ID, details of the transaction including transaction amount, currency code, time and date of the transaction, etc., information about the financial institution including name, location, website, etc., and other data useful in carrying out the transaction. In the alternative the message may merely contain data relating to a payment authorization, or it may contain such authorization data along with transaction details. The message can also be digitally "signed" using, for example, a cryptographic message authentication code. For example, the message might be hashed, and the hash encrypted with a private key, in which case the integrity of the message can be verified by the recipient by decrypting the value with a corresponding public key and comparing it to a locally-computed hash. Other such digital signing techniques may be used. The message generated in step 63 is an example of "transaction information", and can be information relating to the current transaction. This message is sent to the presenter 42 in step 64 and forwarded by the presenter 42 in step 65 to the relying party 41. In exemplary embodiments it is possible that the relying party 41 does not receive any financial account or cardholder data associated with the presenter. The issuer 43 does not need to send such data to consummate a transaction, and for future references to the transaction (such as for settlement, chargebacks, etc.), the transaction identifier can suffice.

By including the payment authorization information and sending it to the relying party 41, a transaction can be efficiently and securely processed. The relying party 41 verifies the message signature in step 66. If the message signature is found valid in step 66, the relying party can finish the transaction in step 67, such as by providing the purchased goods or services. Because the message from the issuer (sent to the relying party in steps 64-65) contains the transaction authorization, the relying party can contact a payment processing network and proceed with the traditional clearing and settlement in step 18. This can include the transfer of funds, in step 70, to a merchant account 40 that is associated with the relying party 41.

D. Payment Authentication Transaction

Figure 6:
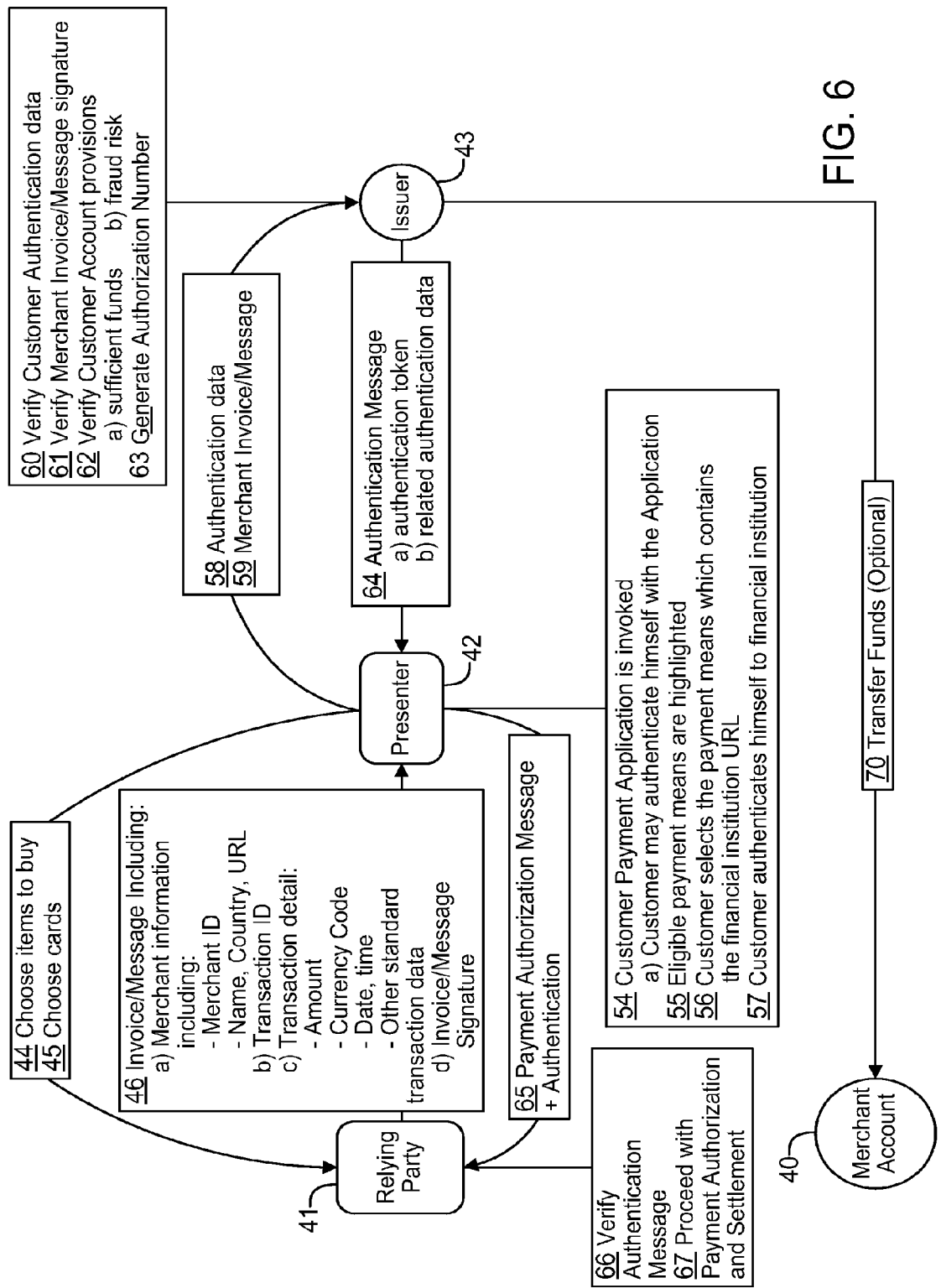
FIG. 6 shows a transaction according to another embodiment of the present invention.

FIG. 6 describes another embodiment of the present invention, where the embodiment is used to provide a payment authorization and authentication from a financial institution. This payment authorization and authentication message can be sent from the financial institution, to the customer, and then forwarded from the customer to the merchant.

As with the previous embodiments, there is a merchant, a customer, and a financial institution corresponding to a relying party 41, a presenter 42, and an issuer 43 respectively. The terms "merchant," "customer," "financial institution," and "party" refer both to individuals or entities and to systems used by these individuals or entities to carry out the invention. One skilled in the art will recognize that the invention is applicable to other types of transactions, in which case the parties might not be a merchant, a customer, or a financial institution. Additionally, as with the prior embodiment, any or all of the messages may be encrypted or protected using cryptographic means to prevent interception or alteration. As in previous embodiments, the starting assumption is that the presenter 42 has been issued a "virtual card" by the financial institution (i.e. the issuer), and this virtual card can reside on the presenter's computer or other network access device. The virtual card can represent a particular identity, including one or more particular claims relating to the presenter 42.

The presenter 42 chooses items to buy in step 44 and, optionally, selects to consummate 45 the transaction using this invention in step 45. Step 45 can be accomplished by alerting the relying party 41 that the invention will be used, or by invoking a customer payment application, or by other suitable means. In response, the relying party 41 sends a message to the presenter 42 in step 46. This message represents a policy and may contain multiple lines of data, including such information as the relying party's identification information (including a merchant identifier, merchant name, and location of the merchant), a transaction identifier, a merchant invoice containing details of the transaction including amount, type of currency, and date and time of the transaction, and a message signature. The policy may include any or all of the above listed data, as well as additional data not listed. Some or all of the above listed data may be sent in a single message or via a plurality of messages.

Upon receiving the policy message, the customer payment application may be invoked in step 54. The presenter 42 will be presented with a set of eligible virtual cards in step 55, wherein each virtual card can be stored on or accessible to the network access device, where eligibility is determined by the requirements in the policy. This may be accomplished using a user interface generated by software on the presenter's network access device. In FIG. 6, some process steps and reference numerals are already shown in FIG. 5 and are described above.

The presenter 42 selects a particular eligible virtual card in step 56 and may authenticate that virtual card, such as by a password or a biometric device, in step 57. The chosen eligible virtual card can contain contact information for the associated issuer, such as a web address, for use in the authentication. The authentication data in step 58 is sent, from the presenter 42, to the issuer 43 for verification. In step 59, the presenter 42 forwards the policy of the relying party 41 to the issuer 43. As stated above, this policy can contain a merchant invoice including transaction information.

The financial institution associated with the chosen virtual card (such as the issuer or a financial institution that the issuer is in communication with) can verify the presenter's authentication data in step 60 and the relying party policy in step 61. This policy, including the amount of the transaction, can be used in verifying the presenter's account in step 62. Step 62 can include checking the presenter's account to verify that she has enough funds to pay for the transaction, and also determine fraud risk, as is known in the art.

Assuming the data is verified, the financial institution can generate a payment authentication message in step 63. This message may contain an authentication token, to ensure that the relying party can trust the message. Such authentication token may be a Cardholder Authentication Verification Value ("CAVV"), which can indicate that the information by the presenter 42 has been successfully verified by the issuer 43. In an embodiment, the CAVV is a cryptographic value including data fields enabling verification that the token was issuer-generated, and may be compatible with 3-D Secure message formats. In certain embodiments, the CAW can include the authorization number. The CAVV may also include card information, such as an account number and expiration date, other information, and a random or unpredictable number for security. In certain embodiments, the CAVV does not include card or account information associated with the presenter. A payment processing network or issuer can use the data fields in the CAVV to link the data collected by authentication with data submitted in a charge request.

The payment authentication message may also contain details of the transaction including transaction amount, currency code, time and date of the transaction, etc., information about the financial institution including name, location, website, etc., and other data useful in carrying out the transaction. In certain embodiments, the message may merely contain data relating to the authentication token. The message generated in step 63 is an example of "transaction information", and can be information relating to the current transaction. This message is sent to the presenter 42 in step 64 and forwarded by the presenter 42 in step 65 to the relying party 41. In exemplary embodiments it is possible that the relying party 41 does not receive any financial account or cardholder data associated with the presenter. The issuer 43 does not need to send such data to consummate a transaction, and for future references to the transaction (such as for settlement, chargebacks, etc.), the transaction identifier can suffice.

By creating an authentication token and sending it to the relying party 41, a transaction can be securely processed. Such tokens can reduce fraud and prevent unauthorized transactions. The relying party 41 verifies the authentication token in step 66. If the message token is found valid in step 66, the relying party can finish the transaction in step 67, such as by providing the purchased goods or services. In embodiments where the message from the issuer 43 (sent to the relying party in steps 64-65) contains the transaction authorization, the relying party can contact a payment processing network and proceed with the traditional clearing and settlement in step 18. This can include the transfer of funds, in step 70, to a merchant account 40 that is associated with the relying party 41. In embodiments where the message from the issuer (sent to the relying party in steps 64-65) contains the transaction authentication, but does not contain a transaction authorization, the relying party can initiate authorization, clearing, and settlement through the payment processing network.

E. Deposit Transaction

Figure 7:
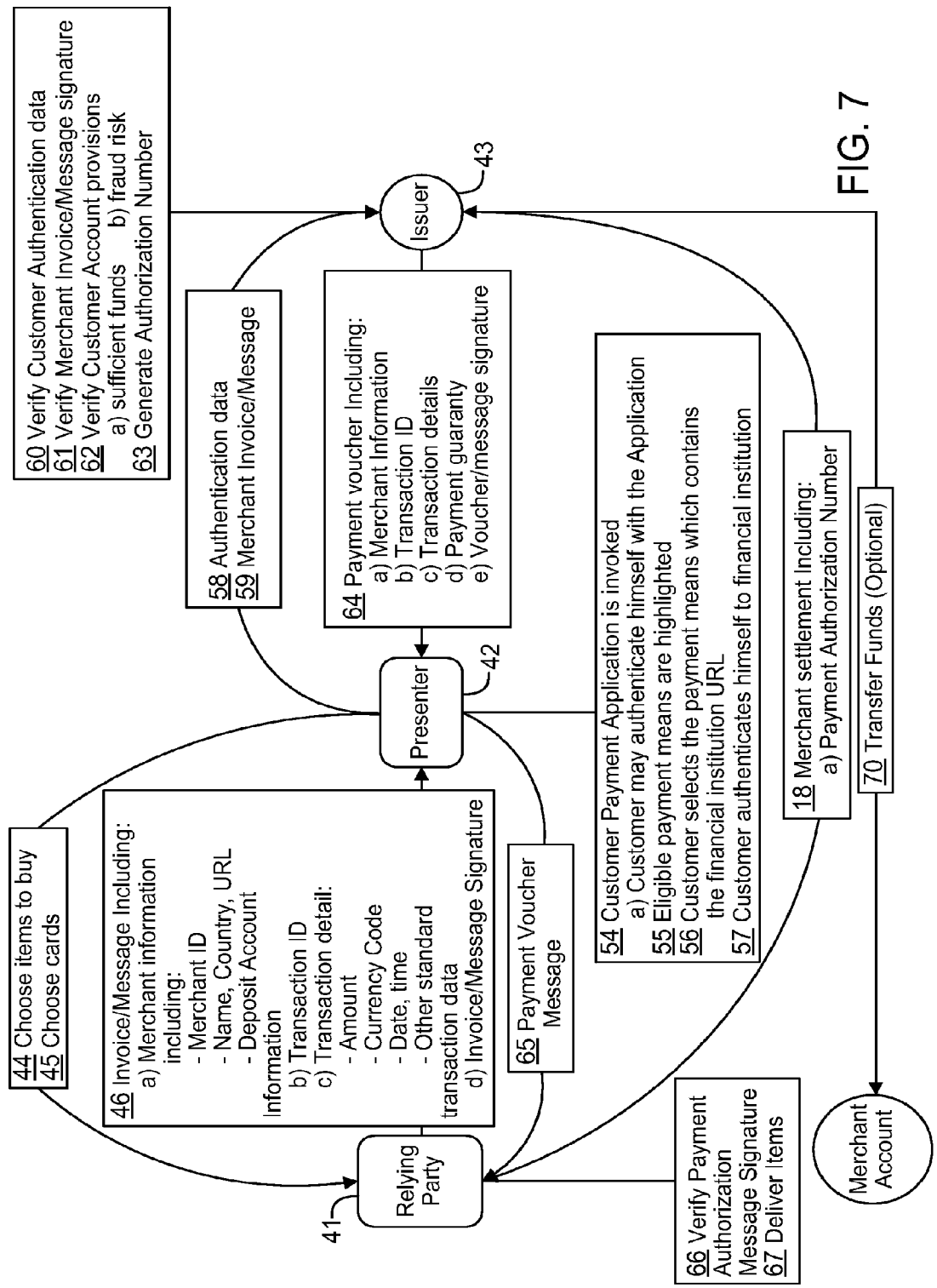
FIG. 7 shows a transaction according to another embodiment of the present invention.

FIG. 7 describes another embodiment of the present invention, where the invention is used to permit a merchant to receive funds corresponding to a payment from a customer, transferred from a financial institution into the merchant's deposit-only or similar account. In an alternative embodiment, the financial institution, rather than transferring payment, may merely send an authorization for payment to the merchant by way of the customer.

As with the previously disclosed embodiments, there is a merchant, a customer, and a financial institution corresponding to a relying party 41, a presenter 42, and an issuer 43 respectively. The terms "merchant," "customer," "financial institution," and "party" refer both to individuals or entities and to systems used by these individuals or entities to carry out the invention. One skilled in the art will recognize that the invention is applicable to other types of transactions, in which case the parties might not be a merchant, a customer, or a financial institution. Additionally, as with the prior embodiment, any or all of the messages may be encrypted or protected using cryptographic means to prevent interception or alteration. As in previous embodiments, the starting assumption is that the presenter 42 has been issued a "virtual card" by the financial institution, and this virtual card can reside on the presenter's computer or other network access device. The virtual card can represent a particular identity, including one or more particular claims relating to the presenter 42.

The presenter 42 chooses items to buy in step 44 and, optionally, selects to consummate 45 the transaction using this invention in step 45. Step 45 can be accomplished by alerting the relying party 41 that the an embodiment of the invention will be used, or by invoking a customer payment application, or by other suitable means. In response, the relying party 41 sends a message 46 to the presenter 42 in step 46. This message represents a policy and may contain such information as the relying party's identification information (including a merchant identifier, merchant name, and location of the merchant), a transaction identifier, a merchant invoice containing details of the transaction including amount, type of currency, and date and time of the transaction, and a message signature. The message can also include a reference to a merchant account 40 associated with the relying party, such as a bank deposit account. The policy may include any or all of the above listed data, as well as additional data not listed. Some or all of the above listed data may be sent in a single message or via a plurality of messages.

Upon receiving the policy message, the customer payment application may be invoked in step 54. The presenter 42 will be presented with a set of eligible virtual cards in step 55, wherein each virtual card can be stored on or accessible to the network access device, where eligibility is determined by the requirements in the policy. This may be accomplished using a user interface generated by software on the presenter's network access device.

The presenter 42 selects a particular eligible virtual card in step 56 and may authenticate that virtual card, such as by a password or a biometric device, in step 57. The chosen eligible virtual card can contain contact information for the associated issuer, such as a web address, for use in the authentication. The authentication data is sent in step 58, from the presenter 42, to the issuer 43 for verification. In step 59, the presenter 42 forwards the policy of the relying party 41 to the issuer 43. As stated above, this policy can contain a merchant invoice including transaction information.

The financial institution associated with the chosen virtual card (such as the issuer or a financial institution that the issuer is in communication with) can verify the presenter's authentication data in step 60 and the relying party policy in step 61.

Step 62 can include checking the presenter's account to verify that she has enough funds to pay for the transaction, and also determine fraud risk, as is known in the art. Assuming the account information and authentication data is verified, the financial institution can generate an payment authorization number in step 63.

The issuer 43 can then deposit the proper funds for the transaction in the merchant account, in step 70. Concurrently with (or subsequent to) depositing the funds in the merchant account, the issuer 43 can generate a payment voucher message in step 63. This message may contain a transaction identifier, details of the transaction including transaction amount, currency code, time and date of the transaction, etc., a guaranty of payment made by the issuer 43, and other data useful in carrying out the transaction. The message will also be digitally "signed" using, for example, a cryptographic message authentication code. For example, the message might be hashed, and the hash encrypted with a private key, in which case the integrity of the message can be verified by the recipient by decrypting the value with a corresponding public key and comparing it to a locally-computed hash. The message generated in step 63 is an example of "transaction information", and can be information relating to the current transaction. Other such digital signing techniques may be used. This message is sent to the presenter 42 in step 64 and forwarded by the presenter 42 in step 65 to the relying party 41. At the same time as the deposit is performed in step 70, settlement can occur in step 18, with both the issuer 43 and the relying party 41 receiving settlement information including the payment authorization number.

Once the relying party 41 receives the message in step 65, it can verify the payment voucher in step 66 (including the message signature), and in step 67 can provide the service or deliver the goods chosen by the presenter in step 44.

In this embodiment, the relying party 41 provides merchant account information to the issuer 43 before transaction authorization. Therefore, the transaction can be authorized, settle, clear, and have the funds transferred in real time. In this way, the relying party 41 does not receive any payment account information (such as a credit card number) related to the presenter 42, which can prevent fraud. This also allows the merchant to receive a payment for the transaction quickly.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Embodiments of the invention contain a number of advantages. Messages sent between the issuer and the relying party can be encrypted, and can also be sent by way of the presenter. By sending messages through the presenter, instead of directly between the issuer and the relying party, there can be maintained greater control of information. The presenter is able to be authorized to the relying party by the issuer, which can increase trust within the system. In certain embodiments, the merchant does not receive financial account information of the presenter, which can reduce the chances of fraud. Embodiments of the invention can leverage the existing communications systems between the presenter and other parties (such as the Internet), and so new communications channels are not needed. Furthermore, in embodiments of the invention the messages among the parties can be encrypted and secured in a variety of ways, which allows for greater security and flexibility of communications. The messages can also comprise large amounts of data including multiple data elements (including data such as deposit account information, website uniform resource location information, guaranties, etc). This can allow for faster transaction processing as more data can be sent at once, and also allows for a more complete transaction. Embodiments of the invention allow for an emulation of a card-present transaction, and further allow for other flexible payment models as described herein.

One or more features from any embodiment may be combined with one or more features of any other embodiment without departing from the scope of the invention.

A recitation of "a", "an" or "the" is intended to mean "one or more" unless specifically indicated to the contrary. A recitation of "she" is meant to be gender neutral, and may be read as "he" or "she", unless specifically indicated to the contrary.

All patents, patent applications, publications, and descriptions mentioned above are herein incorporated by reference in their entirety for all purposes. None is admitted to be prior art.

What is claimed is:

1. A computer-implemented method comprising:
    receiving, by a computer, authentication data for a transaction from a network access device of a presenter, wherein the presenter is associated with one or more virtual cards, and wherein the authentication data relates to a virtual card selected by the presenter;
    verifying, by the computer, the authentication data;
    generating, by the computer, an authentication token for the transaction based at least in part on the verification of the authentication data, the authentication token comprising encrypted information for enabling verification that the authentication token was issuer-generated;
    receiving, by the computer, a transaction request message from a relying party device of a relying party, wherein the transaction request message is routed to the computer through the network access device of the presenter; and
    transmitting, by the computer, a transaction response message to the relying party device, wherein the transaction response message is routed to the relying party device through the network access device of the presenter, and wherein the transaction response message includes transaction data relating to the selected virtual card and the authentication token.

2. The method of claim 1, wherein the network access device is a mobile device.

3. The method of claim 1, wherein the transaction request message from the relying party device includes a form fill request for the transaction data relating to the selected virtual card.

4. The method of claim 1, wherein the transaction response message includes a message signature, and wherein the relying party device proceeds with the transaction after verifying the authenticity of the message signature.

5. The method of claim 1, wherein the transaction data includes track 2 data or chip data relating to the selected virtual card.

6. The method of claim 1, wherein the transaction response message includes an authorization of the transaction.

7. The method of claim 6, further comprising:
    receiving, by the computer, a settlement request message from the relying party device.

8. The method of claim 1, wherein the transaction data relating to the selected virtual card includes an indication that the authentication data is verified.

9. The method of claim 1, further comprising:
    transferring, by the computer, funds for the transaction into a deposit account associated with the relying party.

10. A computer comprising:
    a processor; and
    a computer readable medium coupled to the processor, wherein the computer readable medium includes code executable by the processor for implementing a method comprising:
    receiving authentication data for a transaction from a network access device of a presenter, wherein the presenter is associated with one or more virtual cards, and wherein the authentication data relates to a virtual card selected by the presenter;
    verifying the authentication data;
    generating an authentication token for the transaction based at least in part on the verification of the authentication data, the authentication token comprising encrypted information for enabling verification that the authentication token was issuer-generated;
    receiving a transaction request message from a relying party device of a relying party, wherein the transaction request message is routed through the network access device of the presenter; and
    transmitting a transaction response message to the relying party device, wherein the transaction response message is routed to the relying party device through the network access device of the presenter, and wherein the transaction response message includes transaction data relating to the selected virtual card and the authentication token.

11. The computer of claim 10, wherein the network access device is a mobile device.

12. The computer of claim 10, wherein the transaction request message from the relying party device includes a form fill request for the transaction data relating to the selected virtual card.

13. The computer of claim 10, wherein the transaction response message includes a message signature, and wherein the relying party device proceeds with the transaction after verifying the authenticity of the message signature.

14. The computer of claim 10, wherein the transaction data includes track 2 data or chip data relating to the selected virtual card.

15. The computer of claim 10, wherein the transaction response message includes an authorization of the transaction.

16. The computer of claim 15, wherein the method further comprises:
    receiving a settlement request message from the relying party device.

17. The computer of claim 10, wherein the transaction data relating to the selected virtual card includes an indication that the authentication data is verified.

18. The computer of claim 10, wherein the method further comprises:
    transferring funds for the transaction into a deposit account associated with the relying party.

19. A computer-implemented method comprising:
    transmitting, by a network access device of a presenter, authentication data for a transaction to an issuer computer of an issuer, wherein the presenter is associated with one or more virtual cards, wherein the authentication data relates to a virtual card selected by the presenter, and wherein the issuer computer verifies the authentication data;

receiving, by the network access device, a transaction request message from a relying party device of a relying party;

transmitting, by the network access device, the transaction request message to the issuer computer;

receiving, by the network access device, a transaction response message from the issuer computer, wherein the transaction response message includes transaction data relating to the selected virtual card and an authentication token, the issuer computer configured to generate the authentication token for the transaction based at least in part on the verified authentication data, the authentication token comprising encrypted information for enabling verification that the authentication token was issuer-generated; and transmitting, by the network access device, the transaction response message to the relying party device.

20. The method of claim 19, wherein the network access device is a mobile device.

21. A network access device of a presenter, the network access device comprising:

a processor; and a computer readable medium, the computer readable medium comprising code, executable by the processor, to implement a method comprising transmitting, by the network access device, authentication data for a transaction to an issuer computer of an issuer, wherein the presenter is associated with one or more virtual cards, wherein the authentication data relates to a virtual card selected by the presenter, and wherein the issuer computer verifies the authentication data, receiving, by the network access device, a transaction request message from a relying party device of a relying party, transmitting, by the network access device, the transaction request message to the issuer computer, receiving, by the network access device, a transaction response message from the issuer computer, wherein the transaction response message includes transaction data relating to the selected virtual card and an authentication token, the issuer computer configured to generate the authentication token for the transaction based at least in part on the verified authentication data, the authentication token comprising encrypted information for enabling verification that the authentication token was issuer-generated, and transmitting, by the network access device, the transaction response message to the relying party device.

* * * * *